United States Patent
Al-Ameri et al.

(10) Patent No.: US 11,772,823 B2
(45) Date of Patent: Oct. 3, 2023

(54) ESTIMATING FATIGUE DAMAGE IN A STRUCTURE

(71) Applicant: BAE Systems plc, London (GB)

(72) Inventors: Monadl Abd Al-Abbas Mansour Al-Ameri, Preston (GB); Bhadrayu Manherlal Ranat, Preston (GB)

(73) Assignee: BAE Systems plc, London (GB)

(*) Notice: Subject to any disclaimer, the term of this patent is extended or adjusted under 35 U.S.C. 154(b) by 344 days.

(21) Appl. No.: 16/759,410

(22) PCT Filed: Nov. 22, 2018

(86) PCT No.: PCT/GB2018/053377
§ 371 (c)(1),
(2) Date: Apr. 27, 2020

(87) PCT Pub. No.: WO2019/110957
PCT Pub. Date: Jun. 13, 2019

(65) Prior Publication Data
US 2020/0339286 A1 Oct. 29, 2020

(30) Foreign Application Priority Data

Dec. 4, 2017 (GB) ..................................... 1720172

(51) Int. Cl.
*B64F 5/60* (2017.01)
*G01L 1/22* (2006.01)
*G01L 1/06* (2006.01)
*B64D 45/00* (2006.01)

(52) U.S. Cl.
CPC .................. *B64F 5/60* (2017.01); *G01L 1/06* (2013.01); *G01L 1/22* (2013.01); *B64D 2045/0085* (2013.01)

(58) Field of Classification Search
CPC .... B64F 5/60; G06F 17/18; B64D 2045/0085
See application file for complete search history.

(56) References Cited

U.S. PATENT DOCUMENTS 8,725,456 B1 5/2014 Saha et al.
2002/0143443 A1* 10/2002 Betters ................... G06Q 10/06
701/32.1

(Continued)

FOREIGN PATENT DOCUMENTS

CN 106372274 A 2/2017
GB 2522110 A 7/2015

(Continued)

OTHER PUBLICATIONS

Search Report under Section 17(5) of Great Britain Application Nuber GB1720172.4, dated May 17, 2018, 4 pages.

(Continued)

*Primary Examiner* — Jennifer Bahls
(74) *Attorney, Agent, or Firm* — Maine Cernota & Rardin (57) ABSTRACT

A method and system method for estimating fatigue damage in a structure obtains fatigue damage data collected using at least one sensor associated with the structure during at least one test operation and also obtains structure use parameter data collected during the at least one test operation. The obtained fatigue data and the obtained use parameter data are used to compute coefficients of at least one generic polynomial function that outputs a fatigue damage value based on inputs representing use parameter data. The at least one generic polynomial function is used to output an estimated fatigue damage value based on inputs representing use parameter data collected during use of the structure.

15 Claims, 4 Drawing Sheets

(56) References Cited

U.S. PATENT DOCUMENTS

| | | |
|---|---|---|
| 2005/0114105 A1 | 5/2005 | Barber |
| 2007/0239663 A1* | 10/2007 | Dyskant ............ G06F 16/24532 |
| 2009/0099790 A1 | 4/2009 | Pado |
| 2009/0211381 A1* | 8/2009 | Zakrzewski ............ H04Q 9/00 |
| | | 73/865.9 |
| 2010/0023209 A1 | 1/2010 | Maisonneuve et al. |
| 2017/0293710 A1 | 10/2017 | Haggerty et al. |

FOREIGN PATENT DOCUMENTS

| | | | |
|---|---|---|---|
| WO | 0241193 A1 | 5/2002 | |
| WO | WO-2004059399 A2 * | 7/2004 | ............ G01H 1/006 |
| WO | 2017053262 A1 | 3/2017 | |

OTHER PUBLICATIONS

Search Report under Section 17(6) of Great Britain patent Application No. GB1720172.4, dated Mar. 12, 2019, 3 pages.

International Search Report and Written Opinion of International Application No. PCT/GB2018/053377, dated Jan. 31, 2019, 13 pages.

Jia-Ruey Chang et al: "Development of a Rutting Prediction Model Through Accelerated Pavement Testing Using Group Method of Data Handling" Natural Computation, 2009. ICNC '09. Fifth International Conference on, IEEE, Piscataway, NJ, Aug. 14, 2009, pp. 367-371, P031591354, ISBN: 978-0-7695-3736-8.

International Preliminary Report on Patentability for International Appl. No. PCT/GB2018/053377, dated Jun. 18, 2020, 8 Pages.

* cited by examiner

ESTIMATING FATIGUE DAMAGE IN A STRUCTURE

RELATED APPLICATIONS

This application is a national phase application filed under 35 USC § 371 of PCT Application No. PCT/GB2018/053377 with an International filing date of Nov. 22, 2018, which claims priority of GB Patent Application GB1720172.4 filed Dec. 4, 2017. Each of these applications is herein incorporated by reference in its entirety for all purposes.

FIELD OF THE INVENTION

The present invention relates to structural health monitoring and, more particularly, to estimating fatigue damage in a structure.

BACKGROUND OF THE INVENTION

Structural Health Monitoring (SHM) systems are known that observe a wide range of structures over time using measurements from an array of sensors. These measurements are used to extract damage-sensitive features, which are analysed to determine the current state of structure health.

In the case of aircraft, SHM systems are conventionally installed to enable operators to accurately monitor fatigue consumption and significant structural events, thereby safeguarding the structural integrity of the aircraft. The information obtained can be used to plan maintenance actions effectively, and to manage the fleet fatigue life consumption pro-actively.

Fatigue, within a structural context, is the accumulation of damage due to repeated loading and unloading cycles. The amount of damage incurred depends on the magnitude and number of cycles at different load levels, and therefore a frequently repeated load much lower than the static design load can have a significant effect on the durability of the structure. When the fatigue damage reaches a critical level a fatigue failure will occur. To protect the aircraft from the dangers of exceeding its 'safe fatigue life' the fatigue damage is monitored using a variety of different methods. The information obtained can be used to assess the current remaining life of an aircraft component, and the rate at which damage is being incurred. Potential failure of in-service components can be assessed and decisions made which enable the component or aircraft to be retired from service at the end of its safe life. SHM systems are capable of performing damage index calculations in real-time and storing them to a storage device for periodic analysis to predict the safe life of the airframe.

One known SHM method uses structural stress measuring sensors to predict the fatigue damage. The strain gauge sensor readings are processed by on-aircraft software to calculate stress and hence damage at each of the monitored locations. A typical system can read 20 or more channels of sensor data. The output is a chart of time against the level of stress.

However, the inclusion and life-time maintenance of sensors embedded in the airframe structure is expensive and so it is desirable to have a method that can provide reliable and accurate information about the condition of the structure without the need for sensors to be fitted to the structure. In the past this has been attempted by using parametric data calculated from finite element load computer modelling to calculate the fatigue life consumed at specified locations on the airframe. In a typical example, approximately 18500 templates are derived from finite element analysis and correlated results of ground based airframe fatigue tests, corresponding to a particular aircraft configuration and set of flight parameters. These templates are then loaded to the aircraft computer that is designated to compute and record in real-time the fatigue damage caused to the aircraft. Ten or more locations can be monitored on the aircraft, with each location being represented by its own set of templates.

In flight real-time data, aircraft parameters (e.g. altitude, speed, g, roll, pitch, etc.), stores configuration and control surface actuator positions are captured from other aircraft systems. These data (e.g. up to 20 parameters) are fed into the on-aircraft stress functions, which calculate the stress at each monitored location by comparison with the templates that were loaded prior to flight. This process iterates to generate a history of stress for each location, which is then stored on on-board the aircraft.

However, finite element load computer modelling has been found to be unreliable and inaccurate in many cases as it is difficult to model the load at various sensitive locations on the platform. As a result, a pessimistic safe life may be predicted and an aircraft can even be retired while it may still have been safe. Taking aircraft out of service early is very costly. Therefore, a better method is needed to accurately predict the safe life of the airframe to keep the aircraft flying longer, thus making it more cost effective.

Embodiments of the present invention are intended to address at least some of the above technical problems.

SUMMARY OF THE INVENTION

Embodiments can improve accuracy over the known parametric method by having a small number of structures, e.g. aircraft, fitted with sensors, such as strain gauges, to measure the fatigue life consumed. That data can be recorded on an on-board storage device, together with relevant use condition/parameter data, such as flight parameters (e.g. altitude, speed, g, roll, pitch, etc) and control surface actuator positions in the case of aircraft. A series of test operations (e.g. flight trials) can be conducted to collect the fatigue life data over the operating envelope of the structure, e.g. aircraft with valid stores configurations (for military aircraft) fitted to the aircraft.

The data gathered from the trials can be used to derive a simple algorithm/function that is cable of predicting the fatigue life consumed in real-time on the structure, e.g. aircraft, in future use. The algorithm/function can comprise a simple polynomial that has coefficients fitted, e.g. using a genetic algorithm technique. The coefficients may be data that is loadable on the same or different structure, e.g. aircraft, such that if changes are made to the structure then the process can be repeated and software used to estimate the fatigue life consumed is unaffected, thus saving the cost of writing and clearing new software. Thus, in the case of aircraft, changes such as flight envelope increases and/or new stores configuration do not require completely new software to be written.

Embodiments relate generally to structural health monitoring and, more particularly, to more accurate real-time fatigue damage calculations when no stress measurement sensors are fitted to a structure, including mobile platforms such as aircraft.

According to one aspect of the present invention there is provided a (computer-implemented) method of estimating fatigue damage in a structure, the method comprising:

obtaining fatigue damage data collected using at least one sensor associated with the structure during at least one test operation;

obtaining structure use parameter data collected during the at least one test operation;

using the obtained fatigue data and the obtained use parameter data to compute coefficients of at least one generic polynomial function that outputs a fatigue damage value based on inputs representing use parameter data, and using the at least one generic polynomial function to output an estimated fatigue damage value based on inputs representing use parameter data collected during use of the structure.

The at least one generic polynomial function may have a form:

$$y_n = \sum_{m=1}^{M_n} \alpha_{mn} x_1^{P1mn} x_2^{P2mn} \ldots$$

where $\alpha_{mn}$ represent m coefficients required to compute output n;
$\{x_1 \ldots x_{Ni}\}$ represent normalised inputs, and
$\{y_1 \ldots y_{Nj}\}$ represent the outputs.

The step of computing the coefficients for a said generic polynomial function may comprise:

creating an initial population of candidate polynomial functions, each of the candidate polynomial functions being of different order and having inputs comprising some or all of the use parameters;

computing coefficients to fit the candidate polynomial functions to a stress envelope for a chosen characteristic of structural damage;

computing a score function for each of the candidate polynomial functions, the score function indicating accuracy in mapping inputs of the candidate polynomial function to a true performance envelope, and recursively using a genetic algorithm to improve the candidate polynomial functions in terms of the score function.

The output of the genetic algorithm may comprise a layer of a Self-Organizing Polynomial Neural Network.

In some cases, the score function may also indicate an extent to which a said candidate polynomial function meets a processing power limit and/or a memory limit of a computing device usable to perform the step of using the at least one generic polynomial function to output an estimated fatigue damage value.

The method may further comprise:

comparing an accuracy of the estimated fatigue damage values with a desired accuracy, and if the accuracy does not meet the desired accuracy then:
dividing the obtained fatigue data and the obtained use parameter data into two or more sets, and
using the obtained fatigue data and the obtained use parameter data of each said set to compute coefficients of a said generic polynomial function associated with that set.

The method may further comprise:

associating use parameter range data with each said set;
checking if the obtained use parameter data falls within the use parameter range data of one of the sets, and
if the obtained use parameter data does fall within the use parameter range data of one of the sets then using the generic polynomial function of that set to output an estimated fatigue damage value, or if the obtained use parameter data does not fall within the use parameter range data of one of the sets then using an alternative technique to output an estimated fatigue damage value.

The alternative technique may comprise finite element analysis.

The test operations may be performed over at least part of an operating envelope of the structure.

There may be a plurality of said sensors associated with a respective plurality of locations of the structure.

The structure may comprise a mobile platform, such as a land, air or water vehicle.

The steps of obtaining the fatigue damage data and obtaining the structure use parameter data may be performed during a said test operation of a first aircraft, and the method may further comprise:

transferring at least the obtained fatigue data and the obtained use parameter data from the first aircraft to a remote computer, wherein the remote computer performs the step of computing the coefficients of at least one generic polynomial function, and the method may further comprise:

transferring data representing the computed coefficients to a computing device on-board a second aircraft that performs the step of using the at least one generic polynomial function to output an estimated fatigue damage value during use of the second aircraft, e.g. in real-time.

According to another aspect of the invention there is provided a computer readable medium storing a computer program to operate methods substantially as described herein.

Other aspects of the invention may provide a vehicle, or vehicle control system, configured to perform methods substantially as described herein. For example, there may be provided a vehicle that includes a component, such as a computing device or control system, configured to execute a method substantially as described herein.

According to another aspect of the present invention there is provided a system adapted to estimate fatigue damage in a structure, the system comprising:

a first computing device configured to:
obtain fatigue damage data collected using at least one sensor associated with the structure during at least one test operation;
obtain structure use parameter data collected during the at least one test operation;

a second computing device configured to:
use the obtained fatigue data and the obtained use parameter data to compute coefficients of at least one generic polynomial function that outputs a fatigue damage value based on inputs representing use parameter data, and a third computing device configured to:
use the computed coefficients to reconstruct the at least one generic polynomial function and use the at least one generic polynomial function to output an estimated fatigue damage value based on inputs representing use parameter data collected during use of the structure.

According to another aspect of the present invention there is provided a computing device having a processor configured to:

process data based on fatigue damage data collected using at least one sensor associated with a structure during at least one test operation, and data based on structure use parameter data collected during the at least one test operation, to compute coefficients of at least one generic polynomial function that outputs a fatigue damage value based on inputs representing use parameter data.

According to another aspect of the present invention there is provided a computing device having a processor configured to:
receive data describing the coefficients computed by the abovementioned computing device, and
use the computed coefficients to reconstruct the at least one generic polynomial function and use the at least one generic polynomial function to output an estimated fatigue damage value based on inputs representing use parameter data collected during use of the structure.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
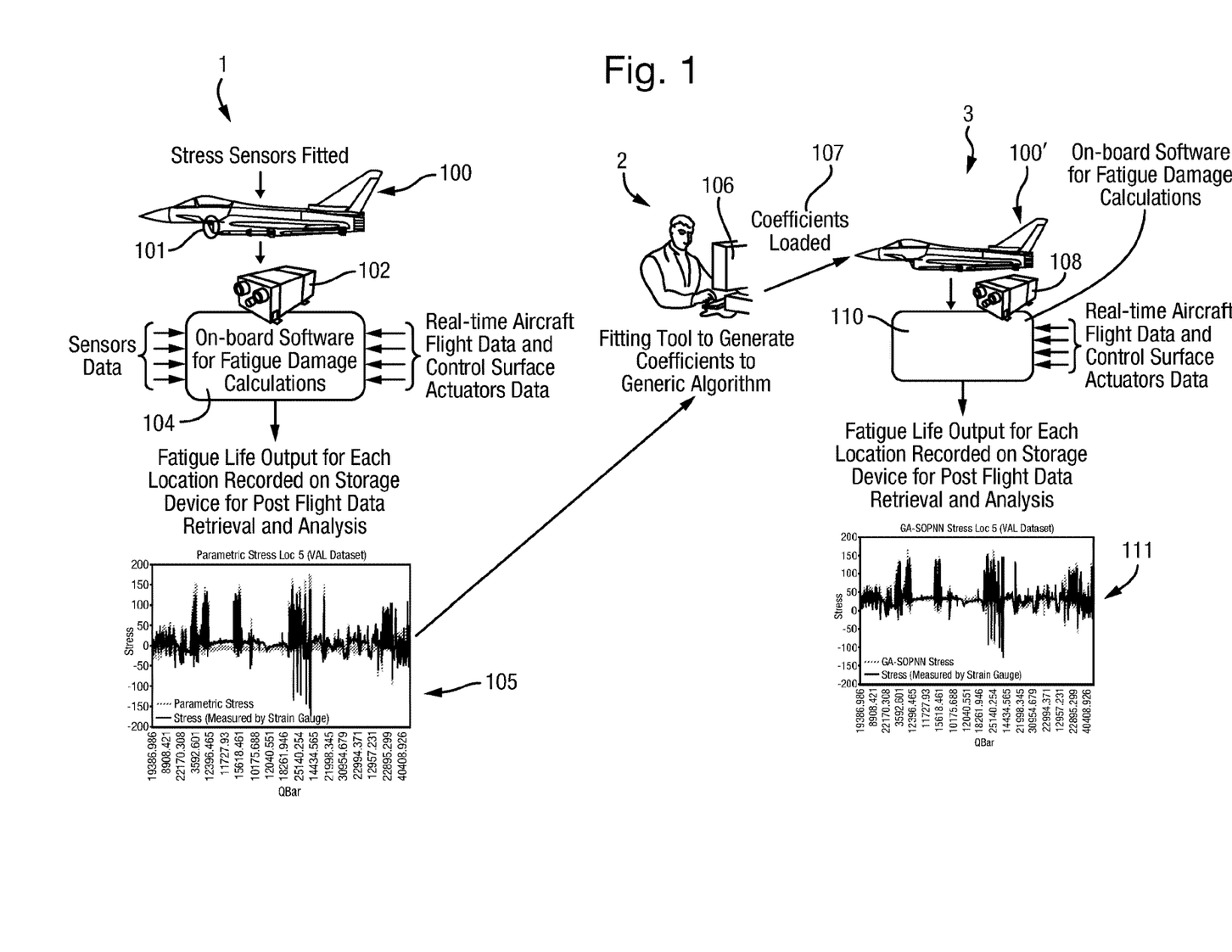
FIG. 1 schematically illustrates operation of an embodiment.

FIG. 1 schematically illustrates operation of an embodiment where fatigue damage is estimated for structures in the form of aircraft. The aircraft used in the embodiment can be of any type, e.g. civilian or military, but it should be understood that alternative embodiments can be used to estimate fatigue damage in relation to a wide range of different structures. The term "structure" should therefore be interpreted broadly, and can encompass a wide variety, ranging from vehicles (land or water-based, as well as airborne) to buildings or systems; for example, power stations, bridges, and so on. Specific examples (non-exhaustive) of structures where alternative embodiments can be used include: blades of wind turbines, blades of helicopters, ships and submarine structures. Embedded strain gauges can be used to monitor fatigue life in such structures and cost savings may again result from using embodiments of the methods described herein.

In brief, in the example set-up of FIG. 1 the following operations (shown generally at 1, 2, 3) are performed:

1. A first computing device 104 on-board a first aircraft 100 obtains data from at least one on-board sensor 101, as well as from a device 102 that records aircraft use parameters (e.g. altitude, speed, roll, pitch, etc), during one or more test flight. The first computing device can process the obtained in-flight data and output data 105 in the form of fatigue damage measured over time, along with the aircraft use parameters that were recorded at the same time, for example.
2. A second computer 106, located remotely from the first aircraft 100 at a ground station, for example, obtains the data 105. This second computer processes the received data to generate coefficients 107 for at least one generic polynomial function that will output an accurate estimate of fatigue damage value based on inputs representing aircraft use parameter data.
3. The generated coefficients 107 can be loaded onto a third computing device 110 located on-board a second aircraft 100'. This second aircraft does not have to include/use sensors or perform test flights, but its computing device 110 executes the same generic polynomial function, using the received coefficients, and inputs representing use parameter data of the second aircraft (substantially in real-time) in order to output values 111 that represent estimated fatigue damage. Thus, the computing device on-board the second aircraft can accurately and efficiently estimate fatigue damage without the need for the second aircraft to be fitted with/use sensors, such as the sensors 101.

In more detail, in the example set up of FIG. 1 the at least one sensor 101 is associated, as is conventional, with a specific location of the first aircraft 100, e.g. a particular position on one of the wings, and at least part of the sensor may be fitted to/adjacent that location in any suitable (permanent or releasable) manner. In the example each sensor comprises a strain gauge, which can converts force, pressure, tension, weight, etc, into a change in electrical resistance which can then be measured and output in any suitable manner. In alternative embodiments, different types of sensors may be used (instead of, or in addition, to strain gauges) to obtain fatigue damage data; examples include accelerometer, temperature, vibration, humidity, chemical and wind speed sensors (e.g. for wind turbine blades).

The first aircraft 100 is also fitted with at least one structure use parameter data recording device 102. This device is intended to record and/or output (typically substantially in real-time) at least one use parameter of the aircraft/structure that can have an effect on fatigue damage. In the case of aircraft, the device can comprise a flight data recorder, or the like, and the parameters can comprise altitude, speed, roll, pitch, etc, as well as data and control signals, actuator data, and so on. It will be understood that in the case of other structures, different types of use parameter(s) can be recorded. For instance, in the case of wind turbine blades, the parameter data obtained could include one or more of: wind speed, speed of rotation, temperature and humidity. Additionally, corrosion rate could also be used as a parameter if the turbine is out at sea.

The first aircraft 100 is also fitted with at least one computing device 104. This first computing device(s) will typically comprise (and/or be in communication with) at least a processor and a storage (e.g. at least an internal memory). It can further include a communications unit, or the like, for exchanging data with other local or remote devices/computers (e.g. via a wired or wireless connection). The computing devices described herein can include components that are common to computers, e.g. user input/output units, etc, which are well-known to the skilled person and need not be described in detail. Further, in some cases the components and/or functions of a computing device may be distributed.

The first computing device 104 can receive data from the at least one sensor 101. In other embodiments, the data from the at least one sensor may be collected and/or processed by another device, e.g. a central sensor controller, which may transfer the data to the first computing device. The first computing device can also receive data from the data recording device 102. Again, in some embodiments, the data from the recording device may be collected and/or processed by another device before being transferred to the computing device. Thus, the first computing device can receive sensor data and aircraft use data, all of which was recorded substantially in real-time and which may also be time-stamped. Alternatively, the first computing device may receive the sensor data and aircraft use data substantially in real-time and can apply time-stamp information to the received data.

The memory of the first computing device 104 can include a set of software instructions that process the received data, e.g. store it in an arranged manner for output/further processing. Additionally or alternatively, the software instructions may process the received data to perform damage index calculations (e.g. in real-time) and store the results for output. Pertinent data can be recorded together with the results (fatigue damage measured over time). The resulting data (illustrated schematically at 105) can be output for post-flight retrieval and analysis. In alternative embodiments, at least some/part of this processing may be performed by a remote computer, e.g. the second computing device 106, based on the data received by the first computing device.

Typically, in use, a small number (e.g. 1-5) of aircraft, such as the first aircraft 100, fitted with the sensor(s) 101 are flight tested during their development period and/or during in-service use. Data as described above can be produced and output by each of these tests for processing, thereby improving the overall accuracy of results. Typically, the test flights may be carried out over at least part of a performance envelope of the aircraft. For other types of structures, different types of test operations (e.g. subjecting locations of the structure to stresses of predetermined magnitudes and/or at predetermined repeated intervals to simulate expected use) may be performed.

The example set up of FIG. 1 also includes the second computing device 106. The second computing device is normally located remotely from the aircraft, e.g. at a ground station. Again, this computing device can be conventional and may comprise (and/or be in communication with) at least a processor and a storage. It can obtain the data 105 output by the first computing device 104 directly or indirectly in any suitable manner, e.g. by loading onto the computing device 106 via a communications unit/link/network, or by means of transportable medium, e.g. a disk or memory card, etc.

The memory of the second computing device 106 can include a set of software instructions that process at least some of the data 105. In some embodiments, the software instructions can process the data 105 to fit it to at least one generic algorithm/polynomial function in order to generate coefficients (illustrated schematically at 107). The generic polynomial function(s) is/are intended to produce an output representing an estimate of fatigue damage of a structure, based on input representing use parameter data of the structure. In some cases, the fitting process can be implemented using a genetic algorithm. In other embodiments, it can be implemented using different techniques, such as normal neural networks or group method data handling. Embodiments can allow the measured stress for different stores configuration of aircraft to be characterised by coefficient data sets suitable for upload to the second aircraft's avionic system and subsequent reconstruction by generic on-board software, as described below. These coefficients "fit" the generic algorithm to the performance stress envelope shape.

The example set up of FIG. 1 also includes the second aircraft 100'. In some cases this second aircraft may be the same as the first aircraft, but not on a test flight. In other cases, the second aircraft may be a physically different aircraft, but is substantially similar in character to the first aircraft, e.g. same model by the same manufacturer, but not a version that differs in any relevant manner that would negatively affect the results of using the generic polynomial function/coefficients in order to estimate fatigue damage of the second aircraft as described herein. Similarly, for different types of structures, the second structure may be the same as the first structure, but being used in practice/"real world" use, rather than for test operations, or the second structure may be a physically different, but similar, entity to the first structure.

The second aircraft 100' is fitted with at least one structure use parameter data recording device 108. This may be (but not necessarily) substantially the same as the flight data recorder 102. In any case, the device 108 can record and/or output use parameter data (e.g. as altitude, speed, roll, pitch, etc, as well as data and control signals, actuator data, and so on) for the second aircraft.

The second aircraft 100' further includes a third computing device 110. Again, this computing device can be conventional and will comprise (and/or be in communication with) at least a processor and a storage. It can obtain data representing the coefficients 107 generated by the second computing device 106 directly or indirectly in any suitable manner, e.g. by loading onto the computing device 110 via a communications unit/link/network, or by means of transportable medium, e.g. a disk or memory card, etc.

The memory of the third computing device 110 can include a set of software instructions that can use the coefficients 107 in the same generic algorithm/polynomial function to output a fatigue damage value, based on inputs representing the use parameter data provided by the use parameter data recording device 108. This may be done in a substantially real-time manner whilst the second aircraft is in flight, e.g. for the entire flight, or for one or more specific portion(s), e.g. take-off or landing, of the flight. Alternatively, the fatigue damage estimation can be performed periodically during or after a flight.

It will be appreciated that the structures, components and steps shown in FIG. 1 are exemplary only and in alternative embodiments some of them may be omitted, and/or steps can be re-ordered and/or performed concurrently rather than sequentially. Further, additional steps (not illustrated) may be performed. The skilled person will understand that steps can be implemented by hardware and/or software, as appropriate, using any suitable programming languages/techniques and data structures.

Figure 2:
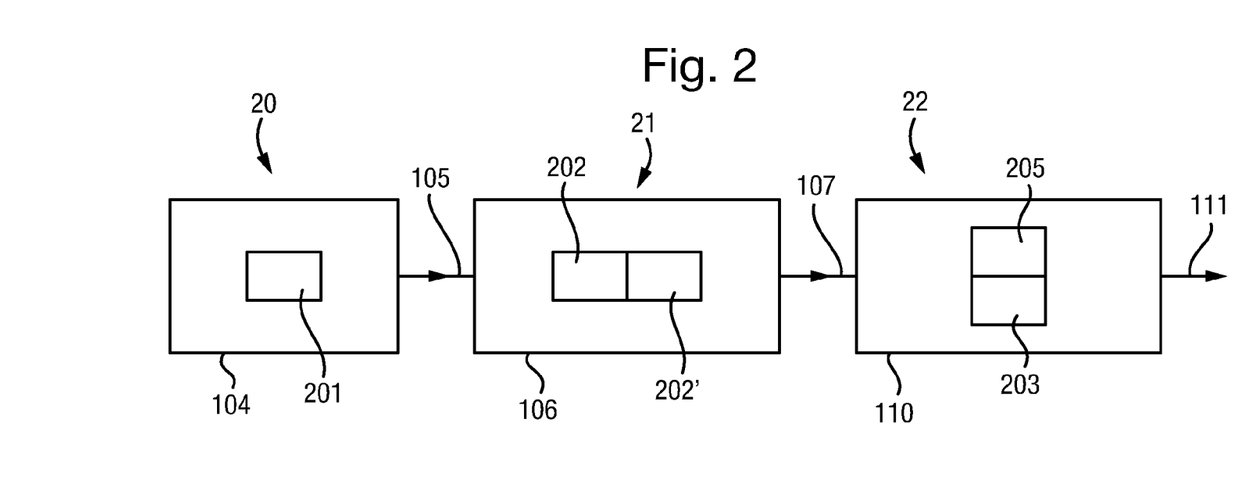
FIG. 2 is a block diagram of computing devices involved in the operation of the embodiment.

FIG. 2 is a block diagram including the first 104, the second 106 and the third 110 computing devices. It schematically shows processes 20 which can be carried out by the first computing device on-board the first aircraft 100, processes 21 which can be carried out by the second computing device 106 at the ground station, and processes 22 that can be carried out by the computing device 110 on-board the second aircraft 100'. The blocks represent functions that can be implemented by one or more sets of software instructions/modules.

In some embodiments the computing device 104 includes a receiver function 201 that obtains the data from the at least one on-board sensor 101, as well as from the device 102 that records the aircraft use parameters during one or more test flight as described above. The first computing device can process the obtained in-flight data and output the data 105, which is received by the second computing device 106.

In some embodiments a coefficient generator function 202 implemented on the second computing device 106 can receive the data output 105 by the first computing device 104. A strategy of iteration based on polynomial fitting followed by analysis of the residuals can be used in some embodiments. In some embodiments this can involve "fitting" the coefficients of a generic polynomial function based on the data 105, e.g. by fitting a geometric shape to a training footprint and defining the coefficients against the measured fatigue damage. Other embodiments can use methods of coefficient generation where the number of inputs and the form of each polynomial descriptor are determined by an optimisation method in the form of a Genetic Algorithm.

In some embodiments the coefficient generator can generate coefficients that "fit" a generic algorithm/polynomial function in the form of the following equation:

$$y_n = \sum_{m=1}^{M_n} \alpha_{mn} x_1^{P1mn} x_2^{P2mn} \ldots$$

where $\alpha_{mn}$ represent m coefficients required to compute output n;

$\{x_1 \ldots x_{Ni}\}$ represent normalised inputs, and $\{y_1 \ldots y_{Nj}\}$ represent the outputs.

Here, the outputs $\{y_1 \ldots y_{Nj}\}$ can be known because they correspond to the fatigue damage measured over time at each sensitive location of the structure, e.g. the fatigue damage values of the first aircraft 100 in the data 105. The inputs $\{x_1 \ldots x_{Nj}\}$ can also be known because they correspond to the use parameter data over time (as provided by the recording device 102 of the first aircraft 100) in the same data 105 that resulted in the measured fatigue damage. Therefore, the coefficient generator 202 can aim to generate the coefficients $\alpha_{mn}$ for all the sensor locations.

Some embodiments may use the Genetic Algorithm as the central mechanism for producing a Self-Organising Polynomial Neural Network (GA-SOPNN), which is a real-time fitted data computation. It can be used to map the inputs to the true performance envelope, and to automate the derivation of the polynomial model's coefficients within each layer. The resulting model might be a single polynomial function, or it may be expressed in terms of multiple layers of nested polynomials.

In some embodiments the process can involve the following steps:
1. Create an initial population of candidate polynomials, of different order with inputs comprising some or all of the flight parameters (e.g. altitude, speed, roll, pitch, etc.). Each polynomial function is a unique solution to the problem.
2. Compute coefficients to fit these candidates to the stress envelope for the chosen characteristic of the Structural Damage, e.g. using the criterion of least-squares error.
3. Compute a score function for each candidate. This function may depend on its accuracy in mapping the inputs to the true performance envelope. In some cases, the function may also depend on the processing load and/or the storage requirement needed for on-line operation. The latter parameters can be put under the control of the developer. For example, information relating to the maximum processing power (e.g. floating point operations per second) and/or register/memory limits (e.g. in MB) of the computing device 110 of the second aircraft 100' may be provided. Embodiments can check whether computation of a candidate function can be performed within these limits, e.g. whether the candidate function will output a result within a certain time at the processing rate and/or the memory limits of the computing device 110.
4. Improve this population recursively using a Genetic Algorithm:
   a) Retain the best scoring candidates.
   b) Reject the worst candidates;
   c) "Breed" a new population with randomly chosen combinations of characteristics drawn from the best group;
   d) Iterate until it stops improving or it meets your accuracy criteria.
5. The result is the first layer of a Self-Organising Polynomial Neural Network (SOPNN), where each node describes a polynomial function that relates the use parameters to a characteristic of the fatigue damage.
6. Outputs from candidate functions in the first layer shall serve as candidate inputs for generating the next layer. This new layer has the effect of creating higher-order candidate polynomials and coefficients for consideration.
7. Repeat steps 1 to 6. Thus, layers can be added to the SOPNN until improvement in the scores of the best candidates ceases.

The final solution generated by the method has a structure similar to a forward neural network whose neurons are replaced by polynomial nodes. The best fit found at the end of this process becomes the nested polynomial that can be used by the on-line software algorithm executed by the computing device 110, for example, see FIG. 3.

Figure 3:
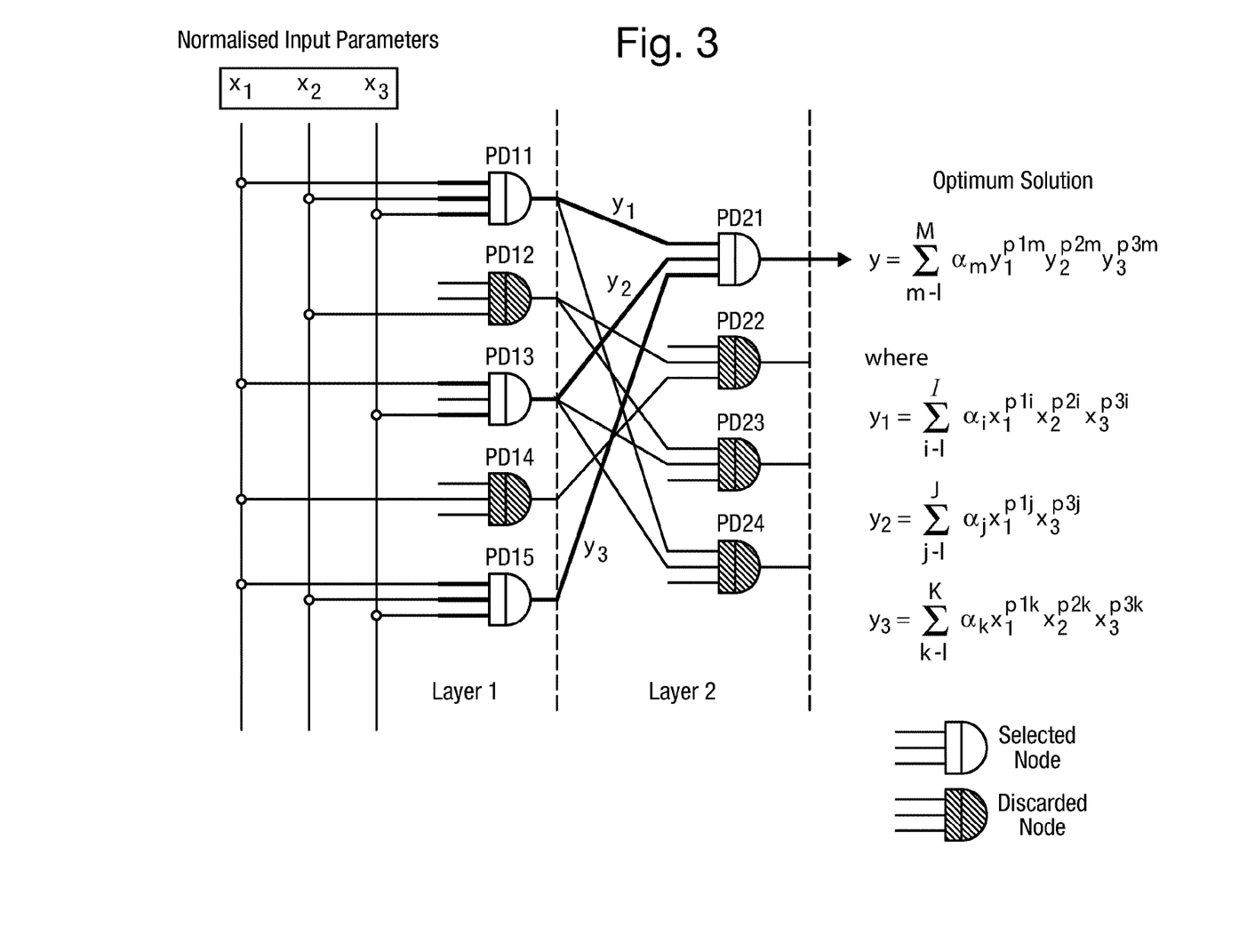
FIG. 3 is a schematic illustration of an example neural network generated by an embodiment.

A completed network comprising two layers is represented in the example of FIG. 3. The final network is obtained recursively from the path ending at the output node with the best score in the final generation of candidates (the Optimum Solution"). Any node with no connection to this path is discarded as shown in FIG. 3, where nodes which contribute to the optimal solution are lightly shaded and discarded nodes are black.

Referring again to FIG. 2, the output of the coefficient generator function 202 is the set of coefficients which is loaded onto the second aircraft 100' by a data uploader. Following this step, the onboard processes 22 comprise a reconstructor function 205, which brings together the generic algorithm/polynomial function 203 (which is held in the aircraft systems) and the uploaded coefficients, so as to reconstruct the algorithm/function for a particular set of use parameters by selecting the appropriate algorithm and coefficients. Thus, the reconstructed function can be used to output accurate fatigue damage values based on inputs representing the use parameters received over a period of time/substantially in real-time. In some embodiments data representing the computed values can be stored and/or transferred to a remote device for further analysis/processing, e.g. to decide when to a replace component of the aircraft 100' based on the fatigue damage value for a particular location. In use, the highest fatigue life figure will be used for safety purposes. Alternatively or additionally, the fatigue damage values may be computed remotely based on usage parameter data recorded/transmitted from the second aircraft 100'.

Figure 4A:
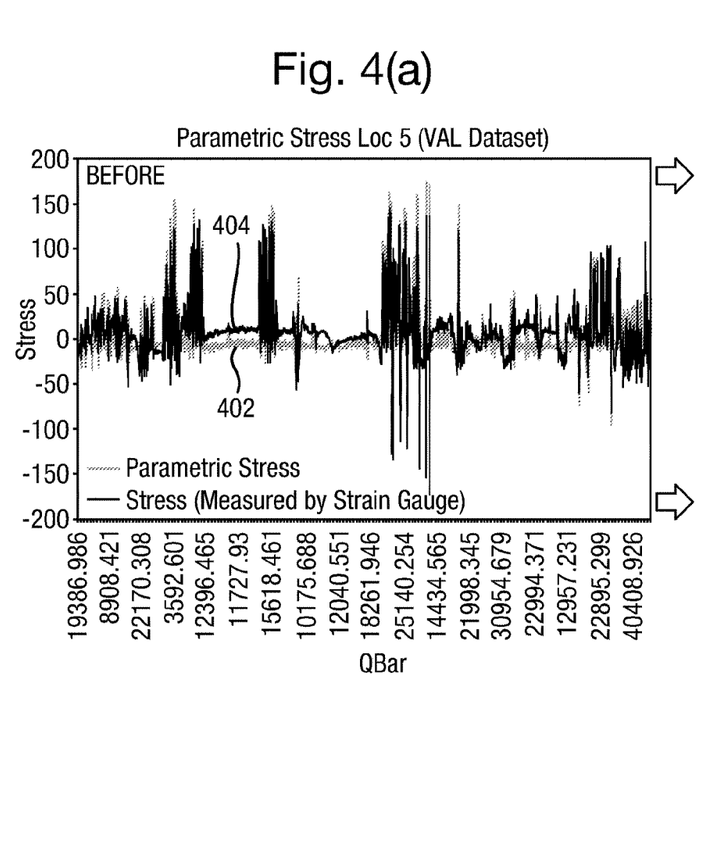
FIGS. 4a and 4b comprise graphs illustrating performance of an embodiment.
Figure 4B:
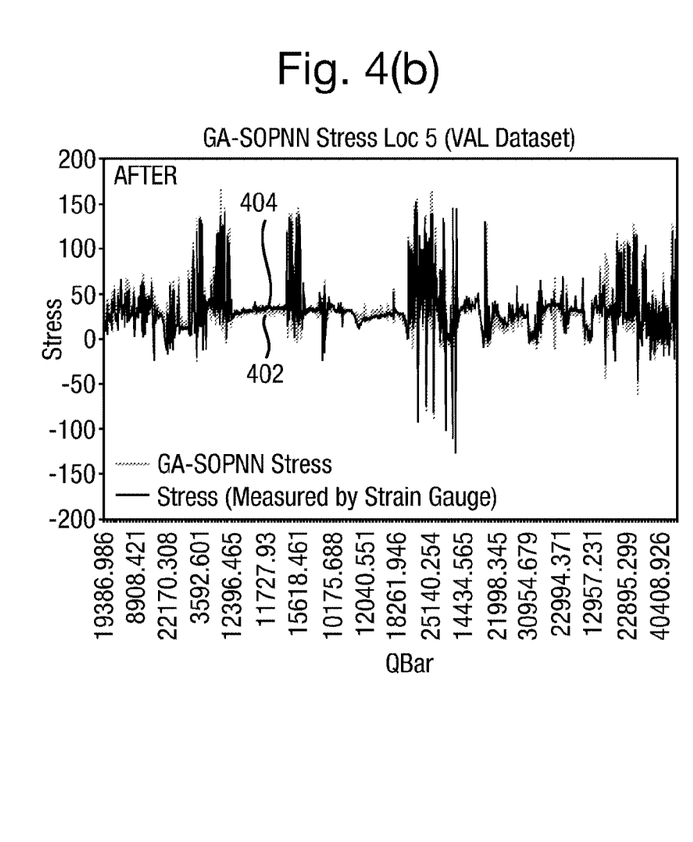

FIG. 4, chart (A) on the left, illustrates an example comparison between fatigue predicted by known parametric method (discussed in the introduction to this specification) and the fatigue as measured by the strain gauge method for a specific location on an aircraft. Generally, there are ten or more location of interest on the aircraft. The chart (B) on the right of FIG. 4 illustrates how a method according to an embodiment as described herein is used to fit the data 402 to the measured stress 404 that can then be applied to aircrafts that are not fitted with the strain gauges to improve the life of the aircraft.

As mentioned above, in some embodiments model selection can be based on a utility/score function, which depends not only on its accuracy in mapping the inputs to the measured results in the data 105 (e.g. the true flight data envelope), but can also depend on the processing load and/or the storage requirement it need for on-line operation by the computing device 110 of the second aircraft 100'.

For example, in a flight envelope 97.5% of peacetime flying occurs. Flight data from at least part of the envelope can be used to train and validate the models produced by the GA-SOPNN method. In one example, the truth data consisted of 19 input parameter inputs and one output. This output was the stress as measured at each location by the strain gauge. In this case, it takes the 19 Flight parameters and the stress measurement from the strain gauge and fits the generic algorithm to this data to create a model. This approach was able to produce greater correlation with the measured data.

The accuracy of the fitting depends on the complexity of the envelope and on the amount of segmentation required to achieve a predefined accuracy (e.g. as input as a percentage value by a user) for the whole or a subset of the envelope during the coefficient generation process. For instance, in one case, a single model was generated for the T-Section envelope. If the model proves inaccurate (i.e. does not satisfy the user-input desired accuracy value) because the stress characteristic is too complicated, then segmentation may be used to break up the envelope to improve modelling accuracy, e.g. using the optional segmentation function 202' shown in FIG. 2. Each segment of the envelope can then have a separate model (comprising one or more generic algorithm/polynomial function) created with its own table of coefficients. It can define the range of input variables values that bound each sub-division of the flight envelope.

In general, a method can comprise comparing the fatigue damage values for a particular (test) set of parameters with the fatigue damage values measured in use for the same set of parameters. If the accuracy of the fatigue damage values does not meet the user-input desired accuracy value then it can be determined that segmentation is needed. In this case, the entire set of data 105 can be divided into two or more segments, and the model generation process can be performed for each such segment. Each model generated in this way may be associated with information that defines the range of use parameter data values for which it has been generated, and this information may also be transferred to the reconstructor function 205 along with the coefficients. In some embodiments, the segmentation and model generation steps may be repeated, with the input data 105 being divided into more/smaller segments each time, until the desired accuracy is achieved.

Figure 5:
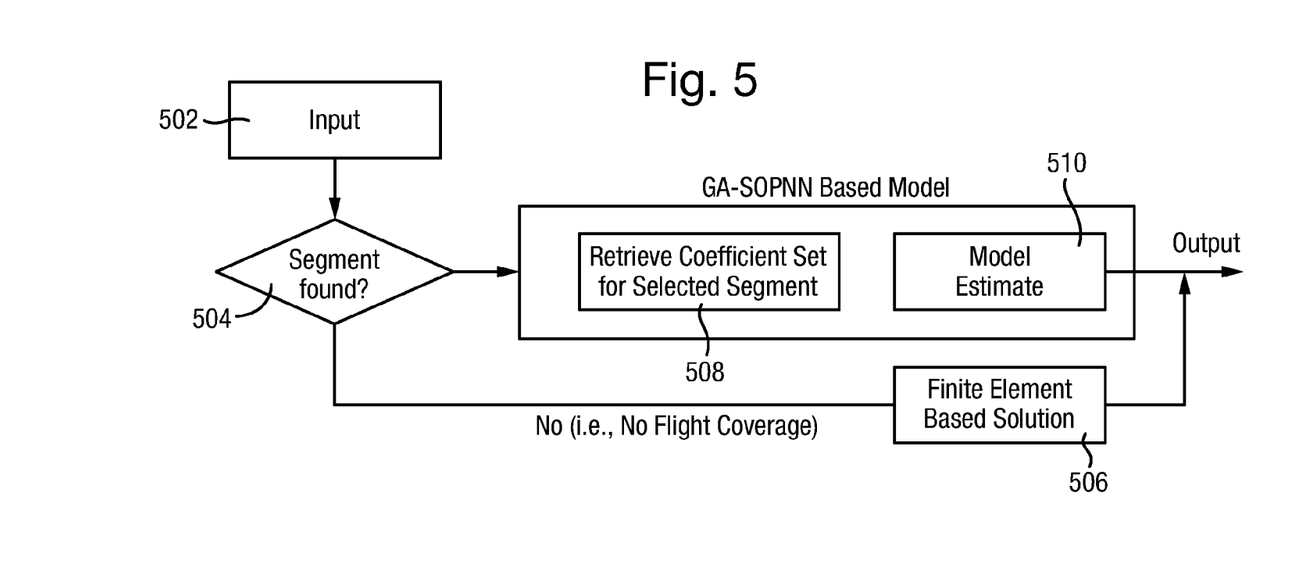
FIG. 5 is a flowchart outlining further operations performed by some embodiments.

An example of on-line operation, e.g. at the computing device 110 of the second aircraft 100', is shown in FIG. 5. At step 502 the current input condition/use parameter data can be received from the device 108. At step 504 a check if performed as to whether an appropriate segment(s) model(s) can be matched to the current input condition/use parameter data, e.g. by checking the associated information. If there is absence of a segment/model corresponding to the current input conditions then this will normally signify the absence of flight recorded data and the GA-SOPNN polynomial model required carry out the fatigue damage estimation. For that part of the envelope where there are very few data available, and in order to minimise their effect on model accuracy, an alternative method can be used instead at step 506 to compute and output a fatigue damage value in this case, e.g. the known finite element solution. The choice can depend on the level of flight coverage and on whether the GA-SOPNN method can estimate the stress to the required accuracy in those areas.

However, if the check of step 504 indicates that an appropriate model is available for the current input condition/use parameter data then at step 508 the coefficients for the relevant model are retrieved and used to reconstruct the generic algorithm/polynomial function. At step 510 that generic algorithm/polynomial function receives the current use parameter data as inputs and outputs a fatigue damage value.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:
1. A method of estimating fatigue damage in an airframe, the method comprising:
   performing a test flight over at least part of an operating envelope of the airframe;
   during the performance of the test operation:
      obtaining fatigue damage data using at least one strain gauge fixed to the airframe; and
      obtaining airframe use parameter data comprising aircraft flight data and control surface actuator data that corresponds to the fatigue damage data;
   using the obtained fatigue data and the obtained airframe use parameter data to compute coefficients of a generic polynomial function that outputs a fatigue damage value based on inputs representing the airframe use parameter data;
   transferring data representing the computed coefficients to a computing device on-board a second airframe, wherein the computing device on-board the second airframe comprises the generic polynomial function; and
   incorporating the computed coefficients into the generic polynomial function of the computing device on-board the second airframe; and using the generic polynomial function to output an estimated fatigue damage value based on inputs representing airframe use parameter data collected during use of the second airframe;
comparing an accuracy of the estimated fatigue damage values associated with the second airframe with a desired accuracy, and, if the accuracy does not meet the desired accuracy then:
dividing the obtained fatigue data and the obtained airframe use parameter data associated with the second airframe into two or more sets; and using the obtained fatigue data and the obtained airframe use parameter data associated with the second airframe of each said set, computing coefficients of a said generic polynomial function associated with that set,
wherein the computing device is configured to receive airframe use parameter data associated with the second airframe, and
wherein the computing device is configured to periodically calculate a fatigue damage value associated with the second airframe.

2. The method according to claim 1, wherein the generic polynomial function has a form:

$$y_n = \sum_{m=1}^{M_n} \alpha_{mn} x_1^{P1mn} x_2^{P2mn} \ldots$$

where:
$\alpha_{mn}$ represent m coefficients required to compute output n,
$\{x_1 \ldots x_{Ni}\}$ represent normalised inputs, and
$\{y_1 \ldots y_{Nj}\}$ represent the outputs.

3. The method according to claim 1, wherein the step of computing the coefficients for said generic polynomial function comprises:
creating an initial population of candidate polynomial functions, each of the candidate polynomial functions being of different order and having inputs comprising some or all of the use parameters;
computing coefficients to fit the candidate polynomial functions to a stress envelope for a chosen characteristic of structural damage;
computing a score function for each of the candidate polynomial functions, the score function indicating accuracy in mapping inputs of the candidate polynomial function to a true performance envelope; and
recursively using a genetic algorithm to improve the candidate polynomial functions in terms of the score function.

4. The method according to claim 3, wherein the output of the genetic algorithm comprises a layer of a Self-Organizing Polynomial Neural Network.

5. The method according to claim 3, wherein the score function also indicates an extent to which a said candidate polynomial function meets a processing power limit and/or a memory limit of a computing device usable to perform the step of using the at least one generic polynomial function to output the estimated fatigue damage value.

6. The method according to claim 1, further comprising:
associating airframe use parameter range data with each said set;
checking if the obtained airframe use parameter data falls within the airframe use parameter range data of one of the sets, and if the obtained airframe use parameter data does fall within the airframe use parameter range data of one of the sets, then, using the generic polynomial function of that set, outputting the estimated fatigue damage value; and
if the obtained airframe use parameter data does not fall within the airframe use parameter range data of one of the sets, then, using an alternative technique, outputting the estimated fatigue damage value.

7. The method according to claim 6, wherein the alternative technique comprises finite element analysis.

8. The method of claim 1 further comprising automatically alerting a responsible party when the fatigue damage value exceeds a predetermined threshold.

9. The method of claim 1 further comprising removing said at least one strain gauge fixed to the airframe from the airframe after obtaining the fatigue damage data.

10. The method of claim 1 wherein the at least one strain gauge fixed to the airframe is only used for initial computation of coefficients.

11. The method of claim 1 further comprising removing the at least one strain gauge fixed to the airframe following computation of coefficients.

12. A system adapted to estimate fatigue damage in an airframe, the system comprising:
a first computing device configured to:
obtain fatigue damage data collected using at least one strain gauge fixed to the airframe during at least one test operation; and
obtain airframe-use parameter data comprising aircraft flight data and control surface actuator data collected during the at least one test operation;
a second computing device configured to:
use data based on the obtained fatigue data and the obtained airframe use parameter data to compute coefficients of a generic polynomial function that outputs a fatigue damage value based on inputs representing use parameter data; and
a third computing device configured to:
use the computed coefficients to reconstruct the generic polynomial function and use the generic polynomial function to output an estimated fatigue damage value based on inputs representing use parameter data collected during use of the airframe;
comparing an accuracy of the estimated fatigue damage values associated with the airframe with a desired accuracy, and, if the accuracy does not meet the desired accuracy then:
dividing the obtained fatigue data and the obtained airframe use parameter data associated with the airframe into two or more sets; and
using the obtained fatigue data and the obtained airframe use parameter data associated with the airframe of each said set, computing coefficients of a said generic polynomial function associated with that set,
wherein the at least one test operation are performed over at least part of an operating envelope of the airframe, and
wherein the at least one strain gauge is configured such that its removal after the at least one test operation does not affect the ability of the third computing device to continue to output estimated fatigue damage values.

13. The system of claim 12 wherein one of the first computing device, the second computing device, the third computing device, or a fourth computing device is further configured to automatically alert a responsible party when the fatigue damage value exceeds a predetermined threshold.

14. A system comprising:
a computing device having a processor configured to process data based on fatigue damage data collected using at least one strain gauge fixed to an airframe during at least one test operation comprising a flight and to process data based on airframe use parameter data comprising aircraft flight data and control surface actuator data collected during the at least one test operation to compute coefficients of a generic polynomial function that outputs a fatigue damage value based on inputs representing use parameter data; and
a second computing device having a second processor and further comprising the generic polynomial function, wherein the second computing device is configured to:
receive data describing the coefficients computed by the computing device,
incorporate the computed coefficients into the generic polynomial function, and
use the generic polynomial function to output an estimated fatigue damage value based on inputs representing use parameter data collected during use of a second airframe of the same type; and
compare an accuracy of the estimated fatigue damage values associated with the airframe with a desired accuracy, and, if the accuracy does not meet the desired accuracy then:
divide the obtained fatigue data and the obtained airframe use parameter data associated with the airframe into two or more sets; and
use the obtained fatigue data and the obtained airframe use parameter data associated with the airframe of each said set, computing coefficients of a said generic polynomial function associated with that set,
wherein the test operations are performed over at least part of an operating envelope of the airframe.

15. The system of claim 14 wherein the processor and second processor are further configured to automatically alert a responsible party when the fatigue damage value exceeds a predetermined threshold.

* * * * *